United States Patent [19]

Rot et al.

[11] Patent Number: 5,479,555
[45] Date of Patent: Dec. 26, 1995

[54] PHOTOPOLYMERIZABLE COMPOSITIONS FOR MAKING OPTICAL MATERIALS AND PROCESS MAKING THEM

[76] Inventors: Alfred Rot; Irina Zaks-Rot, both of 1123 E. 58 St., Brooklyn, N.Y. 11234

[21] Appl. No.: 257,143

[22] Filed: Jun. 9, 1994

[51] Int. Cl.$^6$ .............................. G02B 6/00; C08F 2/50; C08F 20/22
[52] U.S. Cl. .................. 385/145; 522/181; 522/182; 522/183; 522/187
[58] Field of Search ........................ 522/181, 183, 522/187, 182; 385/145

[56] References Cited

U.S. PATENT DOCUMENTS

| | | | |
|---|---|---|---|
| 3,785,850 | 1/1974 | Parker | 522/181 |
| 4,230,548 | 10/1980 | Adelmann et al. | 522/163 |
| 4,721,377 | 1/1988 | Fukuda et al. | 351/159 |
| 4,783,544 | 11/1988 | Yokoshima et al. | 522/183 |
| 5,143,997 | 9/1992 | Endo et al. | 522/135 |
| 5,276,068 | 1/1994 | Waknine | 522/81 |

*Primary Examiner*—Susan W. Berman
*Attorney, Agent, or Firm*—Wigman, Cohen, Leitner & Myers

[57] ABSTRACT

A photocurable resin composition useful for producing plastic optical materials, comprises at least one compound of formula (I) represented by the formula:

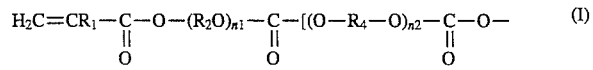

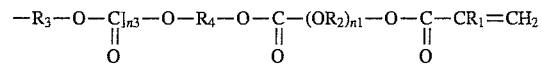

wherein $R_1$ is H or $-CH_3$;

$R_2$ is $-CH_2-CH_2-$; $-CH_2-CH(CH_3)-$; $-CH_2-CH(CH_2Cl)-$; $n_1$ is 1 to 6

$R_3$ is $-CH_2-CH_2-$; $-(CH_2)_2-O-(CH_2)_2-$; $-(CH_2)_2-O-(CH_2)_2-O-(CH_2)_2-$; $-(CH_2)_2-O-(CH_2)_2-O-(CH_2)_2-O-(CH_2)_2-$;

$R_4$ is

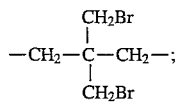

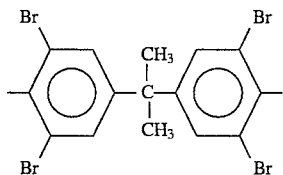

$n_2$ is 1 to 2

$n_3$ is 0 to 3 and a photoinitiator. Also a polymeric material, an optical material, a lens, a protective coating for optical fibers and an adhesive for multilayer glass with the inventive photocurable resin composition are proposed.

26 Claims, No Drawings

PHOTOPOLYMERIZABLE COMPOSITIONS FOR MAKING OPTICAL MATERIALS AND PROCESS MAKING THEM

BACKGROUND OF THE INVENTION

The present invention relates to a plastic optical material, in particular for optical discs, lenses, fibers and glasses and a process for making the same.

Photopolymers are increasingly used in production of optical devices for all stages of optical discs manufacturing, such as replicate coatings for video discs and "direct read after write" discs, protective coatings for compact discs, substrates for "direct read after write" and erasable discs. They are also used for production of different kinds of lenses such as protective coatings and substrates for aspherical lenses, substrates and protective coatings for glass lenses, intraocular lenses, Frenel lenses. They are used for different technologies and stages of optical fibers production. Finally, they are used as adhesives and coatings for different kinds of multilayer glasses, etc.

It has been recognized that the properties of the main types of acrylic monomers and formulations on their basis do not assure the requirements presented to the most sophisticated parts of optical devices. It is especially difficult to achieve such necessary properties for optical photopolymers as high refractive index, low birefringence, low volume shrinkage, low moisture absorption, high flame retardance, the combination of sufficient impact and scratch resistance.

U.S. Pat. No. 4,477,328 discloses a photocurable resin composition on the basis of alkylene-bis (phenoxyalkyl-acrylate) represented by the formula

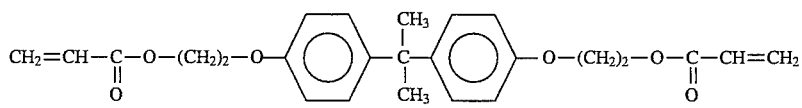

However, the resulting substrates and coatings of optical discs and aspherical lenses are not-satisfactory as to moisture resistance, flame retardance, impact resistance, scratch resistance and further exhibits a considerable optical anisotropy (high birefringence).

EPA 0156372 A2 proposes to overcome the disadvantages of the prior art by using a photopolymerizable composition comprising a compound having 4 or more (meth-)acrylic groups in one molecule, e.g. dipentaerythritolhexaacrylate;

a compound represented by the formula

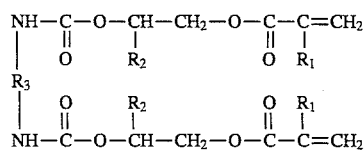

wherein $R_1$, $R_2$=H, $CH_3$;

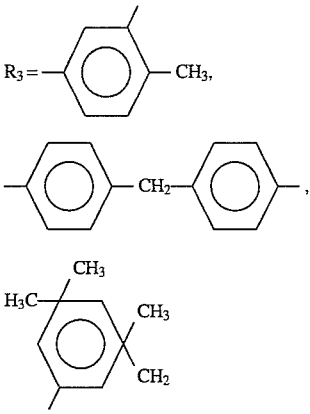

or $(CH_2)_n$ (m=3 to 10);

a compound of the formula

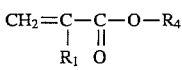

wherein $R_4$ is a hydrocarbon group having 6 to 16 C atoms, and a photoinitiator in an amount of 0.5 to 10 parts. However, according to this patent, the resulting article has too low a refractive index and a flame retardance and has a rather large volume shrinkage.

JP 4-372736 discloses an optical disc base made via a photosetting resin compound consisting of trimethylolpropane triacrylate, dipentaerythritol hexaacrylate modified with caprolactone, and hydroxypiperic acid neopentylglycol diacrylate modified with caprolactone. According to this application, the mixture of the aforesaid components in certain proportions is critical and provides a compromise between the unsatisfactory properties of each component, so that a Young modulus exceeding 100 kg/mm² at room temperature is obtained together with satisfactory heat resistance and bending strength. No information, however, is provided as to the optical properties of the resulting polymer, particularly refractive index and birefringence.

In conclusion, the polymeric materials or photopolymerizable monomeric compositions of the prior art produce optical device bases which leave room for improvement as to the combination of mechanical and optical properties.

SUMMARY OF THE INVENTION

Accordingly, it is an object of the present invention to provide plastic optical materials that have a satisfactory combination of birefringence, refractive index, volume shrinkage, moisture resistance, flame retardance, impact resistance and scratch resistance, required for their purpose.

It is another object of the invention to provide a polymeric material for plastic optical devices having the aforesaid properties.

It is also a further object of this invention to provide a monomeric or oligomeric composition that is photocurable and produces a polymeric material having the aforesaid properties.

It is still a further object of the invention to provide a plastic material for optical devices which has any or preferably a combination of the following properties:

Refractive index—not less than 1.53;
Birefringence—not more than 10 nm/mm;
Volume shrinkage-not more than 6.0%;
Flame retardance-not less than V-1 (according to Vertical Burning Test);
Impact resistance-not less Wan 20 kg/c.m;
Scratch resistance-not less than 5000 rev/min.

Preferably the monomeric or oligomefic composition for making the plastic optical devices according to the invention has a viscosity not greater than 500 cPs, which is convenient for technological purposes.

The invention, in one of its aspects, provides a photocurable resin composition useful for producing a material for plastic information recording media, in form of a coating (having a thickness from 5 to 100 m) or a substrate (having a thickness from 100 m to 10 mm), which comprises:

at least one compound of formula (I) represented by the formula (or mixtures of two or more of them):

$$H_2C=CR_1-\underset{\underset{O}{\|}}{C}-O-(R_2O)_{n1}-\underset{\underset{O}{\|}}{C}-[O-R_4-O)_{n2}-\underset{\underset{O}{\|}}{C}-O-R_3-O-\underset{\underset{O}{\|}}{C}]_{n3}-O-R_4-O-\underset{\underset{O}{\|}}{C}-(OR_2)_{n1}-O-\underset{\underset{O}{\|}}{C}-CR_1=CH_2 \quad (I)$$

wherein $R_1$ is H or —$CH_3$;

$R_2$ is —$CH_2$—$CH_2$—;

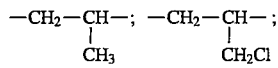

$n_1$ is 1 to 6

$R_3$ is —$CH_2$—$CH_2$—; —$(CH_2)_2$—O—$(CH_2)_2$—; —$(CH_2)_2$—O—$(CH_2)_2$—O—$(CH_2)_2$—; —$(CH_2)_2$—O—$(CH_2)_2$—O—$(CH_2)_2$—O—$(CH_2)_2$—;

$R_4$ is

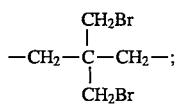

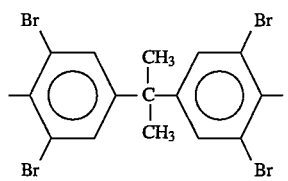

$n_2$ is 1 to 2
$n_3$ is 0 to 3

Further, optionally, the resin composition has to comprise one of the following compounds or mixtures of two or more of them:

a compound of the formula (II) represented by the formula:

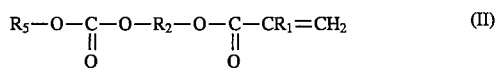

wherein $R_1$ and $R_2$ are the same as in the formula (I) and $R_5$ is

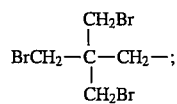

$CH_2=CH-CH_2-$; $CH_3-$; $C_4H_9-$;

a compound of formida (III) represented by the formula

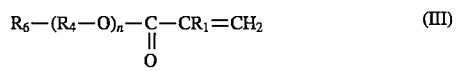

wherein $R_1$ and $R_4$ are the same as in formula (I);

$R_6$ could be Br or $CH_2=CR_1$—COO—;

n is 1 or 2 a compound of formula (IV) represented by the formula

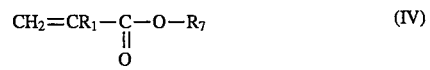

where $R_1$ is H or —$CH_3$;

$R_7$ is

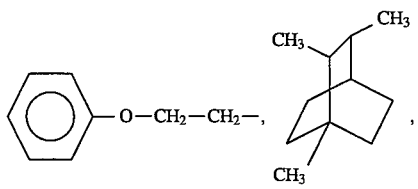

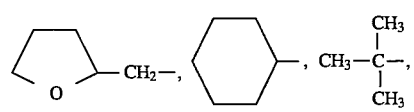

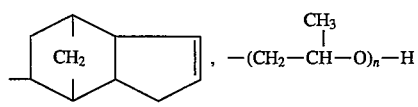

(n is 1 to 6),

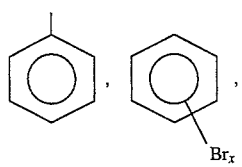

x is 1 to 5 a compound of formula (V) represented by the formula $$R_8-Ar-(CR_1=CH_2)_n \quad (V)$$

wherein $R_1$ is H or —$CH_3$; $R_8$ is —$CH_3$, halogen, —$C(CH_3)_3$;

Ar is

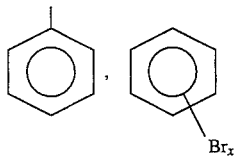

x is 1 to 4 n is 1 or 2

In all cases, the resin composition must include a photo-initiator in an amount of 0.5 to 10 parts by weight per 100 parts by weight of the total of the above-mentioned compounds I to V.

The invention further includes polymeric materials obtained by the light-catalyzed polymerization of the aforesaid resin compositions. Said materials are crosslinked, and, as an indication of the degree of cross-linking, in many cases the amount of gel fraction may be about 90% and the conversion of double bonds about 60%.

The invention also includes such polymeric materials which are characterized by a refractive index not lower than 1.53, a birefringence not more than 10 nm/mm, a volume shrinkage not more than 6.0%, a moisture absorption not more than 1.0%, a flame retardance not less than U-1, an impact resistance not less than 5,000 rev/min.

The invention also includes plastic optical materials, in particular substrates, coatings and adhesives for different kinds of optical discs, lenses, optical fibers, multilayer glasses, consisting essentially of said polymeric materials, and processes for making them by photocuring the aforesaid resin compositions. In particular embodiments of the invention, the components of the resin composition are prepared as will be described hereinafter.

DESCRIPTION OF THE PREFERRED EMBODIMENTS

As specified hereinabove the present invention provides a photocurable plastic optical material useful for producing a material for plastic information recording media, in form of a coating (having a thickness from 0,005 to 0.1 mm) or a substrate (having a thickness from 0.1 mm to 10 mm), which comprises:

at least one compound of formula (I) represented by the formula (or mixtures of two or more of them):

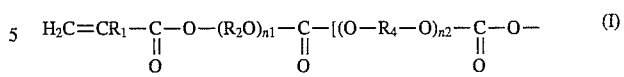

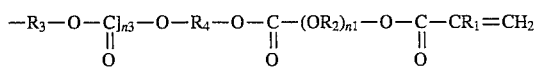

wherein $R_1$ is H or —$CH_3$;

$R_2$ is —$CH_2$—$CH_2$—;

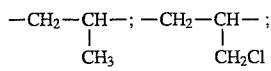

$n_1$ is 1 to 6

$R_3$ is —$CH_2$—$CH_2$—; —$(CH_2)_2$—O—$(CH_2)_2$—; —$(CH_2)_2$—O—$(CH_2)_2$—O—$(CH_2)_2$—; —$(CH_2)_2$—O—$(CH_2)_2$—O—$(CH_2)_2$—O—$(CH_2)_2$—;

$R_4$ is

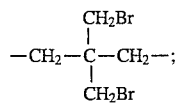

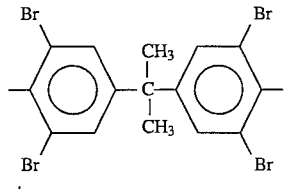

$n_2$ is 1 to 2

$n_3$ is 0 to 3

The components of the photocurable resin composition according to the invention may be prepared as follows:

Examples of compound of formula (I) are dibromoneopentyldicarbonate (meth-)acrylates, tetrabromodipentaerythritoldicarborate (meth-)acrylate, tetrabromobisphenol A dicarbonate (meth-)acrylates. The compounds of the formula (I) may be synthesized by the reaction of the dibromoneopentylglycol or tetrabrOmodipentaerythritol or tetrabromobisphenol A with (meth-) acryloyloxyalkylchloroformate or: with alkylenbis-chloroformate and hydroxyalkyl (meth-) acrylate.

For instance, the mixture of 52.4 g (0.2 mole) of dibromoneopentylglycol, 38.4 g (0.48 mole) of pyridine and 150 ml of methylene chloride is cooled down to −10° C. The solution of 84.7 g (0.44 mole) of 2-hydroxy ethylmethacrylate chloroformate and 70 ml methylene chloride is added dropwise to the reactor at permanent stirring. The temperature is raised up to the room temperature. The mixture is refluxed at room temperature for 1 hour and gently warmed at 40° C. for 2 hours (procedure A).

Procedure B includes adding of 40 ml of methylene chloride to the mixture of 6.5 g (0.025 mole) dibromoneopentylglycol, 19.2 g (0.24 mole) of pyridine, 75 ml methylene chloride at temperature 10° C. and permanent stirring the solution of 23.0 g (0.1 mole) of diethyleneglycol bis-chloroformate in 30 ml of methylene chloride dropwise added. Then 13.0 g (0.1 mole) of 2-hydroxyethylmethacrylate is gradually added. The mixture is refluxed for 1 hour and warmed at 40° C. for 1 hour.

Examples of compound (II) are tribromoneopentyl-alcoholcarbonate (meth-)acrylate and allylcarbonate (meth-)acrylate, methylcarbonate (meth-)acrylate, 1-butylcarbonate (meth-)acrylate, may be synthesized by the similar reactions of tribromoneopentylalcohol, allyl alcohol, methanolon, 1-butanol with chloroformates and hydroxyalkyl-(meth-)acrylates.

Examples of compound (III) are tribromoneopentyl (meth-)acrylate, dibromoneopentyldi(meth-)acrylate, tetrabromodipentaerythritoldi(meth)acrylate, tetrabromobisphenol A di(meth-)acrylate.

Examples of compound (IV) are phenoxyethyl (meth-)acrylate, tetrahydrofurfuryl (meth-)acrylate, cyclohexyl-(meth-)acrylate, isobutylcyclohexyl (meth-)acrylate, dicyclopentenyl (meth-)acrylate, propylene glycol (meth-)acrylate, isobornyl (meth-)acrylate, benzyl-(meth-)acrylate, pentabromobenzyl (meth-)acrylate.

Examples of compound (V) are styrene, tribromostyrene. Examples of photoinitiators are: 2,2-dimethoxy-2-phenylacetophenone, 2-hydroxy-2-methyl- 1-phenylpropane-1-one, 2-chlorothioxanthone. In order to prepare the essentially monomeric resin compositions it is necessary to use 30–80 parts by weight of compound (I), preferably 40–70 parts per 100 parts of its mixture with at least one of the compounds (II)–(V) or their mixture. When the amount of the compound (I) is less than 30 weight parts the resulting photopolymer shows increased birefringence and decreased flame retardance. If its amount is more than 80 weight parts, the viscosity of the resin composition becomes too high and mechanical properties require some regulation. the photoinitiator is used in an amount of 0.5 to 10, preferably 0.7 to 3 parts, per 100 parts of the other components of the composition.

In order to make the final product the resin composition is cast into a cavity defined by a mold or is covered the surface of optical device. The thickness of the layer is from 0,005 to 10,0 mm, When it is less than 0.05 mm, the resulting coating for carrying information pattern produced from the photopolymerizable composition is too thin to show desirable mechanical strength, and has a tendency to produce noise when the information is read, due to foreign particles adhering to those surfaces that carry no information. (Adherence of such particles to those surfaces that do carry information should be avoided by operating under especially clean conditions.) On the other hand, when the thickness of the cavity is more than 10,0 mm, the resulting coating or substrate becomes too thick, and has undesired uncured portions therein.

Typical sources of actinic radiation include a high-pressure mercury lamp, a low-pressure mercury lamp, a xenon lamp, a metal halide lamp, etc., in the case of ultraviolet light. Suitable irradiation amounts are 30 to 500 mW/cm$^2$ in the wavelength range of 320 to 400 nm.

In the case of production of substrates, at least one of the two components of the nold, viz. The die having the information pattern defined therein and the releasable plate, or both of them, must be transparent, and the irradiation is carried out correspondingly from one or both sides of the mold.

The plastic optical device thus produced is small in terms of optical strain, is transparent and has good moisture resistance which protects the medium from warpage due to moisture absorption, good heat resistance which prevents warpage due to use at high temperatures (such as 70° C. and higher), and good mechanical strength preventing breakdown due to impact.

This invention is illustrated by way of the following examples in which the properties were evaluated as follows:

Curing Characteristics

The state of curing was judged by observing the surface appearance of a cured article. This test should show the absence of tackiness.

Refractive index was evaluated by Pulfrich refractometer.

Birefringence was evaluated by polarization microscope's measuring a single pass at a wavelength of 830 nm.

Volume shrinkage was determined by comparing the specific gravity before and after cure.

Moisture absorption was determined by comparing the samples weight before and after 24 hour exposure in water.

Flame-retardance was determined using Vertical Burning Test. This test essentially exposes a vertically suspended 12.7×127 mm sample to a Bunsen burner flame and rates its flame-retardance according to the duration of sample burning, distance of flame travel, and presence of flaming drips. The highest rating is V-0, followed by V-1.

Impact resistance was determined using Y-1A machine. The method is based on the evaluating of photopolymers deformation after talling of permanent weight from different heights.

Scratch resistance was determined during the contact between the surface of photopolymer samples and abrasive. The quantity of abrasive revolutions caused fractures appearance is the criterion of photopolymers scratch resistance.

EXAMPLE 1

A photocurable composition was prepared by mixing 60 parts of dibromoneopentylglycol dicarbonate methacrylate (received in accordance with the procedure A in detailed description), 40 parts of tribromoneopentylcarbonate methacrylate and 2parts of 2,2-dimethoxy-2-phenylacetophenone as photoinitiator.

A nickel die was used. A releasable plate was prepared by taking a dimethylpolysiloxane releasing agent on a surface of glass circular plate. A cavity 0.8 mm thick was created by combining the die and the releasable plate. The resin was cast under vacuum into the cavity. UV light with a wavelength from 320 to 400 nm from a high pressure mercury lamp with an intensity of 400 mV/cm$^2$ was radiated through the releasable plate 2 for 40 seconds to cure the composition. Then, the releasable plate and the die were opened to give the plastic information-recording medium.

The properties of the resulting article were as follows:

| | |
|---|---|
| refractive index | 1.56 |
| birefringence | 3 nm/mm |
| volume shrinkage | 5.8% |
| moisture absorption | 1.0% |
| flame retardance | V-0 |
| impact resistance | 25 kg · cm |
| scratch resistance | 5000 revolutions/min. |

EXAMPLE 2

A photocurable composition was prepared by mixing 70 parts of dibromoneopentyl glycol dicarbonate methacrylate (received in accordance with procedure B-1 in detailed description), 15 parts of allylcarbonate methacrylate, 15 parts of isobornylacrylate and 2 parts of 2-hydroxy-2-methyl- 1-phenylpropane-1-one as photoinitiator.

A small quantity of the formulation is applied to the surface of a spherical glass substrate. This in turn is pressed into a quartz glass mold with the desired aspherical profile. On irradiation with UV light (Fusion Systems curing unit, required dosage 1.0 Jcm$^2$ using one "D" lamp; doses were measured with an IL 390 radiometer manufactured by International Light Co.) through the mold, the photopolymerization process is initiated. The coatings with thickness ~0.08 mm were polymerized within 1 minute.

The properties of the resulting aspherical lenses coating were as follows;

| refractive index | 1.54 |
|---|---|
| birefringence | 10 nm/mm |
| volume shrinkage | 5.2% |
| moisture absorption | 0.6% |
| flame retardance | V-0 |
| impact resistance | 30 kg · cm |
| scratch resistance | 6600 revolutions/min. |

EXAMPLE 3

A photocurable composition was prepared by mixing 70 parts of dibromoneopentyl glycol dicarbonate acrylate (received in accordance with procedure B-2 in detailed description and using propylene glycol acrylate instead 2-hydroxy-ethylmethacrylate), 30 parts of isobornylacrylate and 2 parts of 2,2-dimethoxy-2-phenyl-acetophenone as photoinitiator.

Films of ~0.08 mm thickness destined for usage as primary coatings for optical fibers were drawn down on cleaned, new glass plates and cured during 1 min on a Fusion Systems curing unit as in Example 2. All plates were stored for a minimum of 16 hours in a temperature/humidity controlled room prior to cutting and measuring. Each of the test specimens cutted from the plate had a dimension 100 mm long by 12.7 mm wide. The properties of the coatings:

| refractive index | 1.53 |
|---|---|
| birefringence | 10 nm/mm |
| volume shrinkage | 5.7% |
| moisture absorption | 1.0% |
| flame retardance | V-1 |
| impact resistance | 40 kg · cm |
| scratch resistance | 5000 revolutions/min. |

Microbend resistance, glass adhesion, coating removal, cure speed, oxidative stability, hydrolytic stability of the coatings are suitable and afford their application as the primary protective coatings for optical fibers.

Properties of the plastic information-recording media produced on the basis of compositions of the other example are listed in the following tables.

TABLE I

| Monomeric Composition | Examples | | | | | | |
|---|---|---|---|---|---|---|---|
| Weight Percent | 4 | 5 | 6 | 7 | 8 | 9 | 10 |
| Compound of Formula (I) | | | | | | | |
| Tetrabromodipentaerythritoldicarbonate methacrylate | 70 | | 60 | | 50 | | 40 |
| Tetrabromobisphenol A dicarbonate methacrylate | | 60 | | 60 | | 50 | |
| Compound of Formula (II) | | | | | | | |
| Tribromoneopentylcarbonate methacrylate | 30 | | | | | | |
| Allycarbonate methacrylate | | 40 | | | | | |
| Compound of Formula (III) | | | | | | | |
| Tribromoneopentylacrylate | | | 40 | | | | |
| Dibromoneopentyldiacrylate | | | | 20 | | | |
| Tetrabromodipentaerythritol-diacrylate | | | | | 30 | | |
| Tetrabromobisphenol A diacrylate | | | | | | 30 | |
| Compound of Formula (IV) | | | | | | | |
| Isobornyl acrylate | | | | | 20 | | 25 |
| Pentabromobenzyl acrylate | | | | | | | 20 |
| Compound of Formula (V) | | | | | | | |
| Styrene | | | | | | 20 | 20 |
| Tribromostyrene | | | | | | | 15 |
| Photoinitiator | | | | | | | |
| 2,2-dimethoxy-2-phenyl-acetophenone | 2 | 2 | 2 | 2 | 2 | 2 | 2 |

TABLE II

Properties of the Photopolymerizable Formulations

| Characteristics | Examples | | | | | | |
|---|---|---|---|---|---|---|---|
|  | 4 | 5 | 6 | 7 | 8 | 9 | 10 |
| Time of photocuring (sec.) | 30 | 50 | 45 | 40 | 40 | 40 | 40 |
| Refractive index | 1.58 | 1.54 | 1.56 | 1.54 | 1.56 | 1.58 | 1.58 |
| Birefringence (nm/mm) | 5 | 10 | 10 | 8 | 7 | 8 | 10 |
| Volume shrinkage | 5.7 | 5.0 | 5.3 | 5.5 | 5.6 | 5.5 | 5.1 |
| Moisture absorption | 0.6 | 0.9 | 0.8 | 0.5 | 0.9 | 0.8 | 0.4 |
| Flame retardance | V-0 | V-1 | V-0 | V-1 | V-1 | V-1 | V-0 |
| Impact resistance (kg · cm) | 20 | 20 | 25 | 25 | 30 | 30 | 25 |
| Scratch resistance (rev/min) | 5500 | 8000 | 5000 | 6000 | 5000 | 5200 | 5800 |

It will be understood that each of the elements described above, or two or more together, may also find a useful application in other types of constructions differing from the types described above.

While the invention has been illustrated and described as embodied in a photopolymerizable optical materials and process making them, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A photocurable resin composition for producing plastic optical materials, comprising a pre-polymer represented by the formula I:

$$H_2C=CR_1-\underset{O}{\underset{\|}{C}}-O-(R_2O)_{n1}-\underset{O}{\underset{\|}{C}}-[(O-R_4-O)_{n2}-\underset{O}{\underset{\|}{C}}-O- \quad (I)$$

$$-R_3-O-\underset{O}{\underset{\|}{C}}]_{n3}-O-R_4-O-\underset{O}{\underset{\|}{C}}-(OR_2)_{n1}-O-\underset{O}{\underset{\|}{C}}-CR_1=CH_2$$

wherein $R_1$ is H or $-CH_3$ $R_2$ is $-CH_2-CH_2-$;

$-CH_2-\underset{CH_3}{\underset{|}{CH}}-$; $-CH_2-\underset{CH_2Cl}{\underset{|}{CH}}-$;

$n_1$ is 1 to 6

$R_3$ is $-CH_2-CH_2-$; $-(CH_2)_2-O-(CH_2)_2-$; $-(CH_2)_2-O-(CH_2)_2-O-(CH_2)_2-$; $-(CH_2)_2-O-(CH_2)_2-O-(CH_2)_2-O-(CH_2)_2-$;

$R_4$ is $-CH_2-\underset{CH_2Br}{\overset{CH_2Br}{\underset{|}{\overset{|}{C}}}}-CH_2-$;

[brominated bisphenol A structure with CH3/CH3 central carbon and four Br on two phenyl rings]

$n_2$ is 1 or 2

$n_3$ is 0 to 3 and a photoinitiator.

2. A photocurable resin composition as defined in claim 1; and further comprising another compound of formula (I) which is mixed with the first mentioned compound of formula (I).

3. A photocurable resin composition as defined in claims 1 or 2; and further comprising at least one of the following compounds or mixtures of two or more of them:

a compound of the formula (II) represented by the formula:

$$R_5-O-\underset{O}{\underset{\|}{C}}-O-R_2-O-\underset{O}{\underset{\|}{C}}-CR_1=CH_2 \quad (II)$$

wherein $R_1$ and $R_2$ are the same as in the formula (I) and $R_5$ is $BrCH_2-\underset{CH_2Br}{\overset{CH_2Br}{\underset{|}{\overset{|}{C}}}}-CH_2-$;

$CH_2=CH-CH_2-$; $CH_3-$; $C_4H_9-$;

a compound of formula (III) represented by the formula $$R_6-(R_4-O)_{m_1}-\underset{O}{\underset{\|}{C}}-CR_1=CH_2 \quad (III)$$

wherein $R_1$ and $R_4$ are the same as in formula (I);

$R_6$ is Br or $CH_2=CR_1-COO-$;

$m_1$ is 1 to 2 a compound of formula (IV) represented by the formula $$CH_2=CR_1-\underset{O}{\underset{\|}{C}}-O-R_7 \quad (IV)$$

wherein $R_1$ is H or $-CH_3$;

$R_7$ is

[phenyl-$O-CH_2-CH_2-$], [bornyl/camphor-like structure with CH3, CH3, CH3],

[tetrahydrofurfuryl $-CH_2-$], [cyclohexyl], $CH_3-\underset{CH_3}{\overset{CH_3}{\underset{|}{\overset{|}{C}}}}-$,

[indene/hydrindane structure with $CH_2$], $-(CH_2-\underset{CH_3}{\underset{|}{CH}}-O)_{m_2}-H$ ($m_2$ is 1 to 6)

[phenyl], [phenyl-$Br_x$], x is 1 to 5 a compound of formula (V) represented by the formula $$R_8-Ar-(CR_1=CH_2)_{m_3} \quad (V)$$

wherein $R_1$ is $-H$ or $-CH_3$; $R_8$ is $-CH_3$, halogen, $-C(CH_3)_3$, $-H$;

Ar is

[phenyl with $R_8$], [phenyl with $R^8$ and $Br_x$], x is 1 to 4

$m_3$ is 1 or 2

4. A photocurable resin composition as defined in claim 1, wherein the photoinitiator is in an amount of 0.5 to 10 parts by weight per 100 parts of the compound of formula (I).

5. A photocurable resin composition as defined in claim 1, wherein the photoinitiator is selected from the group consisting of 2,2-dimethoxy-2-phenylacetophenone, 2-hydroxy-2-methyl-1-phenyl-propane-1-one and 2-chlorothioxantone.

6. A photocurable resin composition as defined in claim 1, wherein the compound of formula (I) is a compound selected from the group consisting of dibromoneopentyldicarbonate(meth)acrylate, tetrabromodipentaerythritol dicarbonate (meth)acrylate and tetrabromobisphenol A dicarbonate(meth)acrylate.

7. A polymeric material obtained by a light catalyzed polymerization of the resin composition according to claim 1.

8. A polymeric material as defined in claim 7, having a refractive index not less than 1.53 and birefringence not more than 10 nm/mm.

9. A polymeric material as defined in claim 7, having a volume shrinkage not more than 6.0%, moisture absorption not more than 1.0%, flame retardance not less than V-1, impact resistance not less than 20 kg.cm, scratch resistance not less than 5000 rev/min.

10. An optical device comprising the polymeric material of claim 7.

11. An optical device according to claim 10 in the form of a lens.

12. A polymeric material obtained by a light catalyzed polymerization of the resin composition according to claim 2.

13. A polymeric material as defined in claim 12, having a refractive index not less than 1.53 and birefringence not more than 10 nm/mm.

14. A polymeric material as defined in claim 12, having a volume shrinkage not more than 6.0%, moisture absorption not more than 1.0%, flame retardance not less than V-1, impact resistance not less than 20 kg.cm, scratch resistance not less than 5000 rev/min.

15. An optical device comprising the polymeric material of claim 12.

16. An optical device according to claim 15 in the form of a lens.

17. A photocurable resin composition as defined in claim 3, wherein the compound of formula (I) and one of the compounds of formulas (II), (III), (IV) and (V) or mixture of two or more of them are combined in amount of 30–80% of the total resin composition.

18. A photocurable resin composition as defined in claim 3, wherein the compound of formula (II) is a compound selected from the group consisting of tribromoneopentylalcohol carbonate (meth)acrylate, allylcarbonate (meth)acrylate, methyl carbonate ethyl (meth)acrylate and 1-butyl carbonate (meth)acrylate.

19. A photocurable resin composition as defined in claim 3, wherein the compound of formula (III) is a compound selected from the group consisting of tribromoneopentyl (meth)acrylate, dibromoneopentyldi (meth)acrylate, tetrabromodipentaerythritol di(meth)acrylate and tetrabromobisphenol A di(meth)acrylate.

20. A photocurable resin composition as defined in claim 3, wherein the compound of formula (IV) is a compound selected from the group of phenoxyethyl (meth)acrylate, tetrahydrofurfuryl (meth)acrylate, cyclohexyl (meth)acrylate, isobutylcyclohexyl (meth)acrylate, dicyclopentyl (meth)acrylate, benzyl (meth)acrylate, pentabromobenzyl (meth)acrylate, propylene glycol (meth)acrylate, isobornyl (meth)acrylate.

21. A photocurable resin composition as defined in claim 3, wherein the compound of formula (IV) is a compound selected from the group consisting of styrene and tribromostyrene.

22. A polymeric material obtained by a light catalyzed polymerization of the resin composition according to claim 3.

23. A polymeric material as defined in claim 22, having a refractive index not less than 1.53 and birefringence not more than 10 nm/mm.

24. A polymeric material as defined in claim 22, having a volume shrinkage not more than 6.0%, moisture absorption not more than 1.0%, flame retardance not less than V-1, impact resistance not less than 20 kg.cm, scratch resistance not less than 5000 rev/min.

25. An optical device comprising the polymeric material of claim 22.

26. An optical device according to claim 25 in the form of a lens.

* * * * *